United States Patent
Lee et al.

(10) Patent No.: US 12,461,529 B2
(45) Date of Patent: Nov. 4, 2025

(54) ROBOT PATH PLANNING APPARATUS AND METHOD THEREOF

(71) Applicants: Hyundai Motor Company, Seoul (KR); Kia Corporation, Seoul (KR)

(72) Inventors: Hwan Hee Lee, Anyang-si (KR); Hun Keon Ko, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 107 days.

(21) Appl. No.: 17/952,726

(22) Filed: Sep. 26, 2022

(65) Prior Publication Data
US 2023/0359210 A1 Nov. 9, 2023

(30) Foreign Application Priority Data
May 4, 2022 (KR) .......................... 1020220055714

(51) Int. Cl.
*G05D 1/00* (2024.01)
*B25J 9/16* (2006.01)

(52) U.S. Cl.
CPC ......... *G05D 1/0214* (2013.01); *G05D 1/0274* (2013.01)

(58) Field of Classification Search
CPC .. G05D 1/0214; G05D 1/0274; G05D 1/0217; B25J 9/1664
See application file for complete search history.

(56) References Cited

U.S. PATENT DOCUMENTS

| 6,259,988 B1* | 7/2001 | Galkowski ......... G01C 21/3881 340/995.22 |
| 8,666,548 B2 | 3/2014 | Lim |
| 11,016,491 B1* | 5/2021 | Millard ................. G06N 3/045 |
| 2010/0174435 A1 | 7/2010 | Lim |
| 2014/0121833 A1* | 5/2014 | Lee ....................... G05D 1/0217 901/1 |
| 2021/0341928 A1* | 11/2021 | Sampaio Martins Pereira ............ G05D 1/0214 |
| 2023/0273031 A1* | 8/2023 | Cai ....................... G05D 1/0217 701/26 |

FOREIGN PATENT DOCUMENTS

| CN | 110645991 A | * | 1/2020 | ............ G01C 21/20 |
| CN | 112327856 A | * | 2/2021 | ......... G01C 21/3446 |

(Continued)

OTHER PUBLICATIONS

KR20130106161A Description Translation Title: Method of Optmizing Global Path of a Mobile Robot Publication date: Sep. 27, 2013 Author: Seo Dong Jin (Year: 2024).*

(Continued)

*Primary Examiner* — Khoi H Tran
*Assistant Examiner* — Trang Dang
(74) *Attorney, Agent, or Firm* — Fish & Richardson P.C.

(57) ABSTRACT

A robot path planning apparatus includes: a storage configured to receive an obstacle occupancy grid map, and a controller. The controller is configured to generate a cost map in which a cost corresponding to a separation distance from an obstacle to a movement area to which a robot is able to move is assigned, based on the obstacle occupancy grid map, determine a first path from a current location of the robot to a destination, and determine a second path by calibrating the first path based on the cost map.

12 Claims, 18 Drawing Sheets

(56) References Cited

FOREIGN PATENT DOCUMENTS

KR        20130106161 A  *   6/2013
KR        10-1339480          12/2013
KR        10-1554515           9/2015

OTHER PUBLICATIONS

CN110645991A Description Translation Title: Route planning method and device based on node adjustment, and server Date: Jan. 3, 2020 (Year: 2025).*
CN112327856A Description Translation Title: Robot path planning method based on improved A-star algorithm Date: Feb. 5, 2021 (Year: 2025).*
Method of Optmizing Global Path of a Mobile Robot KR20130106161A Description Translation Author: Seo Date: Sep. 27, 2013 (Year: 2025).*
Robot path planning method based on improved A-star algorithm CN 112327856 A Description Translation Author: He et al. Date: Feb. 5, 2021 (Year: 2025).*

* cited by examiner

| 100 | 100 | 100 | 100 | 100 | 100 | 100 | 100 | 100 | 100 | 100 | 100 | 100 | 100 | 100 | 100 | 100 |
|---|---|---|---|---|---|---|---|---|---|---|---|---|---|---|---|---|
| 99 | 99 | 99 | 99 | 99 | 99 | 99 | 99 | 99 | 99 | 99 | 99 | 99 | 99 | 99 | 99 | 100 |
| 98 | 98 | 98 | 98 | 98 | 98 | 98 | 98 | 98 | 98 | 98 | 98 | 98 | 98 | 98 | 99 | 100 |
| 97 | 97 | 97 | 97 | 97 | 97 | 97 | 97 | 97 | 97 | 97 | 97 | 97 | 97 | 98 | 99 | 100 |
| 98 | 98 | 98 | 98 | 98 | 98 | 98 | 98 | 98 | 98 | 98 | 98 | 98 | 97 | 98 | 99 | 100 |
| 99 | 99 | 99 | 99 | 99 | 99 | 99 | 99 | 99 | 99 | 99 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |
| 100 | 100 | 100 | 100 | 100 | 100 | 100 | 100 | 100 | 100 | 100 | 99 | 98 | 97 | 98 | 99 | 100 |

Fig.3

ROBOT PATH PLANNING APPARATUS AND METHOD THEREOF

CROSS-REFERENCE TO RELATED APPLICATION

This application claims the benefit of priority to Korean Patent Application No. 10-2022-0055714, filed in the Korean Intellectual Property Office on May 4, 2022, the entire contents of which are incorporated herein by reference.

TECHNICAL FIELD

The present disclosure relates to a technology for planning a safe path of a mobile robot based on a cost map.

BACKGROUND

A robot is a device that automatically performs a certain task or operation, and is used to replace or assist humans in various fields. The types of robots include humanoid robots, mobile robots, industrial robots, surgical robots and the like.

It is important to control robot motions to perform a task or service given to the robot. Techniques for handling robot motions are basically based on path planning algorithms. In the field of robotics, term "path planning" is also called motion planning.

In the path planning algorithm, the RRT (Rapidly-Exploring Random Tree) algorithm is generally used in situations with high degrees of freedom or complex constraints. The RRT algorithm builds a data structure (tree) using a random search in configuration space.

In other words, the RRT algorithm is an algorithm that visualizes a tree by modeling a configuration of a robot or its part as a single point in the configuration space, and finds out a path meeting constraints from the initial configuration (location of the robot) to the final configuration (destination). Here, the extension of the tree T is repetition of a process of determining the closest node among nodes belonging to the tree T in a configuration randomly sampled in the configuration space and selecting a new node separated by a certain distance from the closest node.

The conventional technology for planning a path of a robot based on such an RRT algorithm needs to necessarily perform a tree expansion process that is close to infinite iteration, and in particular, and perform a pre-processing process of expanding an obstacle area to prevent the robot from colliding with an obstacle, in the process of planning the path of the robot.

Accordingly, the conventional technology has a problem in that a lot of time is required to plan a path because the area for sampling nodes that can be reflected in the path planning (the area not occupied by obstacles) is reduced due to the above-described pre-processing process.

In particular, the conventional technology has a problem in that the robot is difficult to move naturally because a planned path includes a section with sharp bends, or safe driving of the robot is difficult because the planned path includes a section in which a sufficient safe distance from obstacles is not secured, even though the time-consuming pre-processing process has been performed.

The matters described in this background are prepared to enhance an understanding of the background of the present disclosure, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure provides a robot path planning apparatus and a method thereof, which generate a cost map in which a cost corresponding to a separation distance from an obstacle is recorded based on an obstacle occupancy grid map, plan the initial path from a current location of a robot to a destination on the cost map, and plan a safe path by calibrating the initial path based on each cost on the cost map, making it possible to secure a sufficient safe distance from the obstacle without a pre-processing process of expanding the area of the obstacle, thereby enabling safe driving of the robot, as well as quickly securing the safe path because there is no need to perform the pre-processing process with time consumed.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a robot path planning apparatus includes storage that stores an obstacle occupancy grid map, and a controller that generates a cost map in which a cost corresponding to a separation distance from an obstacle is recorded, based on the obstacle occupancy grid map, plans an initial path from a current location of a robot to a destination, and plans a safe path by calibrating the initial path based on the cost map.

In some implementations, the robot path planning apparatus may include a sensor device that detects an obstacle around the robot, and the controller may add an area corresponding to the obstacle detected by the sensor device to the obstacle occupancy grid map.

In some implementations, the controller may generate the cost map by assigning a higher cost as a distance from the obstacle is shorter.

In some implementations, the controller may plan a shortest path as the initial path.

In some implementations, the controller may calculate vectors from one node on the initial path to adjacent areas based on the cost map individually, primarily determine an area in which a sum of the vectors is located as a location of the one node on the initial path, and primarily calibrate the initial path by moving the one node on the initial path to the primarily-determined location.

In some implementations, the controller may calculate vectors for adjacent areas having a lower cost than a cost of an area in which the one node on the initial path is located.

In some implementations, the controller may calculate vectors from the one node on the primarily-calibrated initial path to two adjacent nodes, respectively, secondarily determine a location corresponding to a sum of the two vectors as a location of the one node on the primarily-calibrated initial path, and secondarily calibrate the initial path by moving the one node on the primarily-calibrated initial path to the secondarily-determined location.

In some implementations, the controller may add a new node at a middle of two adjacent nodes on the secondarily-calibrated initial path when a distance between the two nodes is greater than a preset first distance.

In some implementations, the controller may delete any one of two adjacent nodes on the secondarily-calibrated initial path when a distance between the two nodes is less than or equal to a preset second distance.

A method of planning a robot path includes storing, by storage, an obstacle occupancy grid map, generating, by a controller, a cost map in which a cost corresponding to a separation distance from an obstacle is recorded, based on the obstacle occupancy grid map, planning, by the controller, an initial path from a current location of a robot to a destination, and planning, by the controller, a safe path by calibrating the initial path based on the cost map.

In some implementations, the method may further include detecting, by a sensor device, an obstacle around the robot, and adding an area corresponding to the obstacle detected by the sensor device to the obstacle occupancy grid map.

In some implementations, the generating of the cost map may include assigning a higher cost as a distance from the obstacle is shorter.

In some implementations, the planning of the initial path may include planning a shortest path as the initial path.

In some implementations, the planning of the safe path may include calculating vectors from one node on the initial path to adjacent areas based on the cost map, respectively, primarily determining an area in which a sum of the vectors is located as a location of the one node on the initial path, and primarily calibrating the initial path by moving the one node on the initial path to the primarily-determined location.

In some implementations, the calculating vectors from one node on the initial path to adjacent areas, respectively may include calculating vectors for adjacent areas having a lower cost than a cost of an area in which the one node on the initial path is located.

In some implementations, the method may further include calculating vectors from the one node on the primarily-calibrated initial path to two adjacent nodes, respectively, secondarily determining a location corresponding to a sum of the two vectors as a location of the one node on the primarily-calibrated initial path, and secondarily calibrating the initial path by moving the one node on the primarily-calibrated initial path to the secondarily-determined location.

In some implementations, the method may further include adding a new node at a middle of two adjacent nodes on the secondarily-calibrated initial path when a distance between the two nodes is greater than a preset first distance.

In some implementations, the method may further include deleting any one of two adjacent nodes on the secondarily-calibrated initial path when a distance between the two nodes is less than or equal to a preset second distance.

BRIEF DESCRIPTION OF THE DRAWINGS

FIG. 3 is a diagram showing an example of a cost map provided in the robot path planning apparatus.

DETAILED DESCRIPTION

Figure 1:
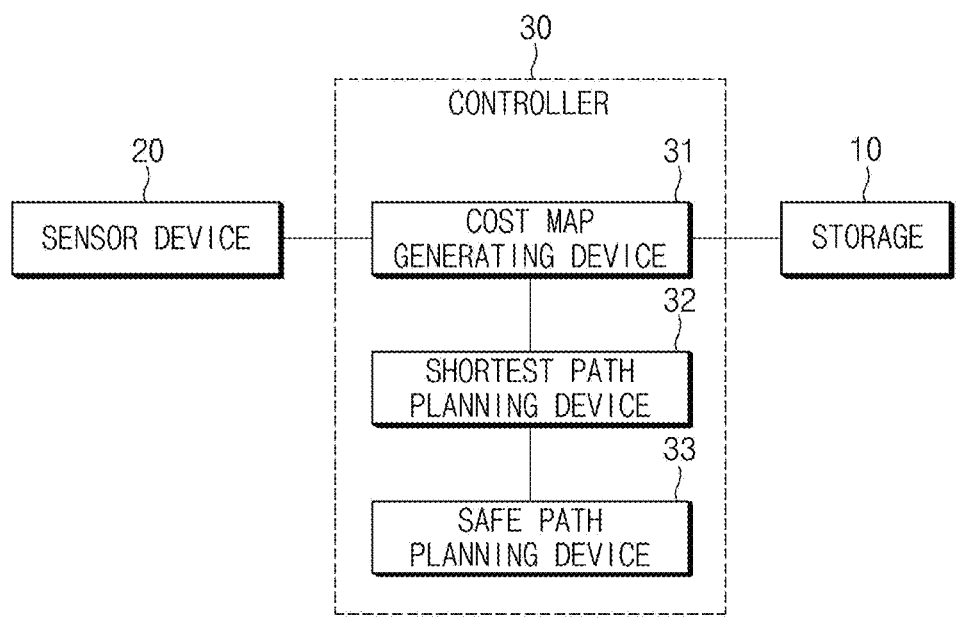
FIG. 1 is a block diagram of a robot path planning apparatus.

FIG. 1 is a block diagram of a robot path planning apparatus.

Referring to FIG. 1, a robot path planning apparatus disclosure may include storage 10, a sensor device 20, and a controller 30. In this case, according to a method of implementing the robot path planning apparatus, the components may be combined with each other as one entity, or some components may be omitted.

Hereinafter, the components thereof will be described. First, the storage 10 may store various logics, algorithms and programs for process of generating a cost map in which costs corresponding to separation distances from obstacles are recorded based on an obstacle occupancy grid map, plan an initial path from a current location of a robot to a destination on the cost map, and plan a safe path by modifying the initial path based on the costs on the cost map.

The storage 10 may store the obstacle occupancy grid map. Here, the obstacle occupancy grid map is a map expressing an area occupied by an obstacle (hereinafter, an obstacle area) in a grid form, wherein the obstacle area may include not only an obstacle area recorded initially in the process of generating the obstacle occupancy grid map (for example, fixed obstacles) but also an obstacle area (e.g., fixed obstacles and moving obstacles) recorded additionally in the obstacle occupancy grid map by the controller 30 when an obstacle is detected by the sensor device provided in the robot later. An example of such an obstacle occupancy grid map is as shown in FIG. 2.

Figure 2:
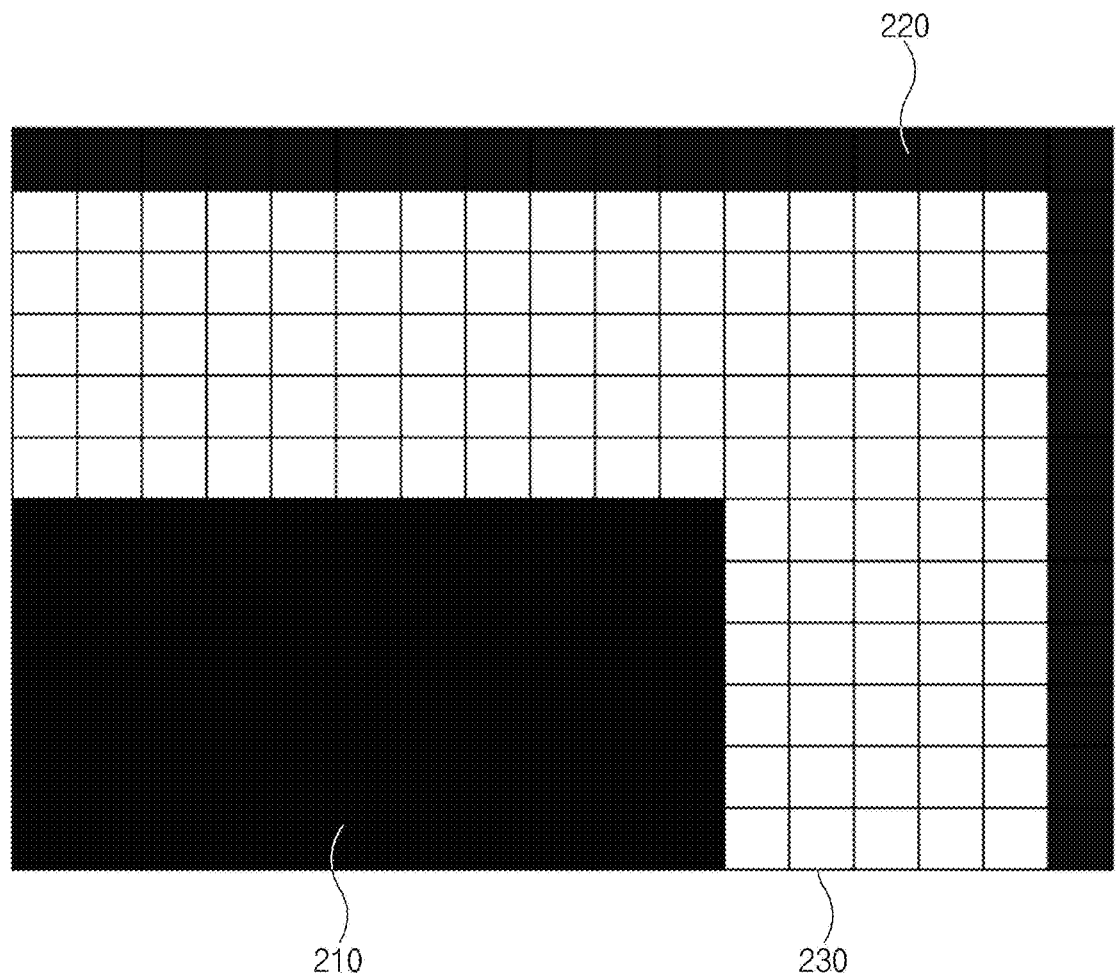
FIG. 2 is a diagram showing an example of an obstacle occupancy grid map provided in the robot path planning apparatus.

FIG. 2 is a diagram showing an example of an obstacle occupancy grid map provided in the robot path planning apparatus.

In FIG. 2, reference numeral '210' denotes an area occupied by an obstacle, for example, representing an area added by the controller 30, reference numeral '220' denotes an area occupied by an obstacle, for example, representing an area recorded when the obstacle occupancy grid map is generated, and reference numeral '230' represents an area to which the robot is able to move (hereinafter referred to as a movement area).

The storage 10 may store a cost map in which a cost corresponding to a separation distance from an obstacle is recorded based on the obstacle occupancy grid map. In this case, the cost map may be generated by the controller 30, and the controller 30 may set a lower cost as the separation distance from the obstacle area 210 or 220 increase, with respect to the movement area 230. The cost map is as shown in FIG. 3 as an example.

FIG. 3 is a diagram showing an example of a cost map provided in the robot path planning apparatus.

In FIG. 3, a grid region having a cost of 100 represents an obstacle area, and the closer the movement area 230 to the obstacle area, the higher the cost. When a plurality of movement areas 230 having such a high cost are included in a path, the safe driving of the robot may be threatened. Therefore, it is preferable to pass through the movement area 230 having a low cost as much as possible, but in some cases, it may be efficient to pass through the movement area 230 having a rather high cost. For example, when passing through a corner area, a robot may pass through the movement area 230 having a rather high cost for stable movement (cornering) of the robot.

The storage 10 may store various algorithms used to plan an initial path from a current location of the robot to a destination. For example, the storage 10 may store a Dijkstra algorithm, an A-star (A*) algorithm, a Rapidly-exploring Random Tree (RRT) algorithm, a Jump Point Search (JPS) algorithm, and the like. In this case, the Dijkstra algorithm or the A-star algorithm for quickly planning the shortest path as the initial path may be mainly used, but the present disclosure is not necessarily limited thereto.

The storage 10 may include at least one type of storage medium of memories such as a flash memory type memory, a hard disk type memory, a micro type memory, and a card type memory (e.g., an SD card (Secure Digital Card) or an XD card (eXtream Digital Card)), a RAM (Random Access Memory), an SRAM (Static RAM), a ROM (Read Only Memory), a PROM (Programmable ROM), a EEPROM (Electrically Erasable PROM), a MRAM (Magnetic RAM), and an optical disk type memory.

The sensor device 20 may be a set of sensors mounted on the robot, and may include a camera, an ultrasonic sensor, a LiDAR (Light Detection and Ranging) sensor, or the like to detect an obstacle in an area including the current location and destination of the robot.

The controller 30 may perform overall control such that each of the above components normally performs its function. The controller 30 may be implemented in the form of hardware or software, or may be implemented in a combination of hardware and software. Preferably, the controller 30 may be implemented with a microprocessor, but is not limited thereto.

In particular, the controller 30 may directly perform a process of generating a cost map in which costs corresponding to separation distances from obstacles are recorded based on an obstacle occupancy grid map, plan an initial path from a current location of a robot to a destination on the cost map, and plan a safe path by modifying the initial path based on the costs on the cost map, or may perform various controls involved with the process.

The controller 30 may include a cost map generating device 31 that generates a cost map in which costs corresponding to separation distances from obstacles are recorded based on an obstacle occupancy grid map, a shortest path planning device 32 that plans a shortest path as an initial path from a current location of a robot to a destination on the cost map, and a safe path planning device 33 that plans a safe path by modifying the initial path based on the costs on the cost map.

Hereinafter, the operation of the controller 30 will be described in detail with reference to FIGS. 3 to 9.

The controller 30 may assign 100 as the maximum cost to an obstacle area, assign a higher cost to the movement area 230 located closer to the obstacle area, and assign a lower cost to the movement area 230 located further away from the obstacle area, thereby generating a cost map based on the obstacle occupancy grid map. The cost map generated as described above is as shown in FIG. 3.

Thereafter, the controller 30 may plan an initial path from the current location of the robot to the destination on the cost map. In this case, the initial path is preferably the shortest path, but is not necessarily limited thereto. The initial path planned as described above is as shown in FIG. 4.

Figure 4:
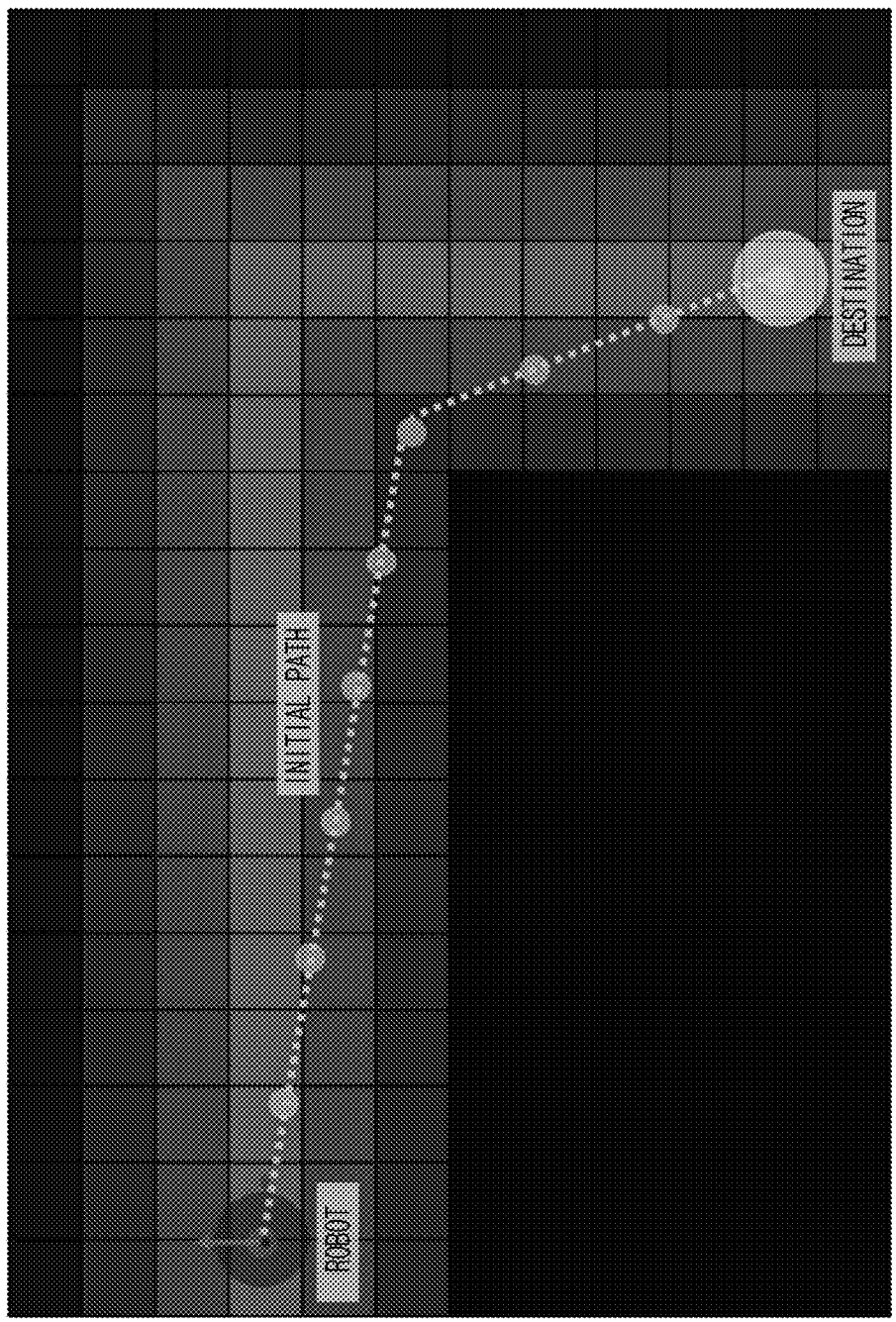
FIG. 4 is a diagram showing an example of a process of planning an initial path in a controller provided by a robot path planning apparatus.

FIG. 4 is a diagram showing an example of a process of planning an initial path by a controller provided in a robot path planning apparatus.

Referring to FIG. 4, the controller 30 may plan, as an initial path, for example, the shortest path from the current location of the robot to the destination by using any one of the Dijkstra algorithm, the A-star algorithm, the Rapidly-exploring Random Tree (RRT) algorithm, and the Jump Point Search (JPS) algorithm. In this case, the initial path may include, for example, eight nodes (excluding a source and a destination). In this case, the controller 30 may plan the shortest path from the current location of the robot to the destination on the cost map, or may plan the shortest path from the current location of the robot to the destination on the obstacle occupancy grid map.

Thereafter, the controller 30 may perform the primary calibration on each of the nodes on the initial path to secure a safe distance from the obstacle in the initial path. This first calibration will be described in detail with reference to FIG. 5A.

Figure 5A:
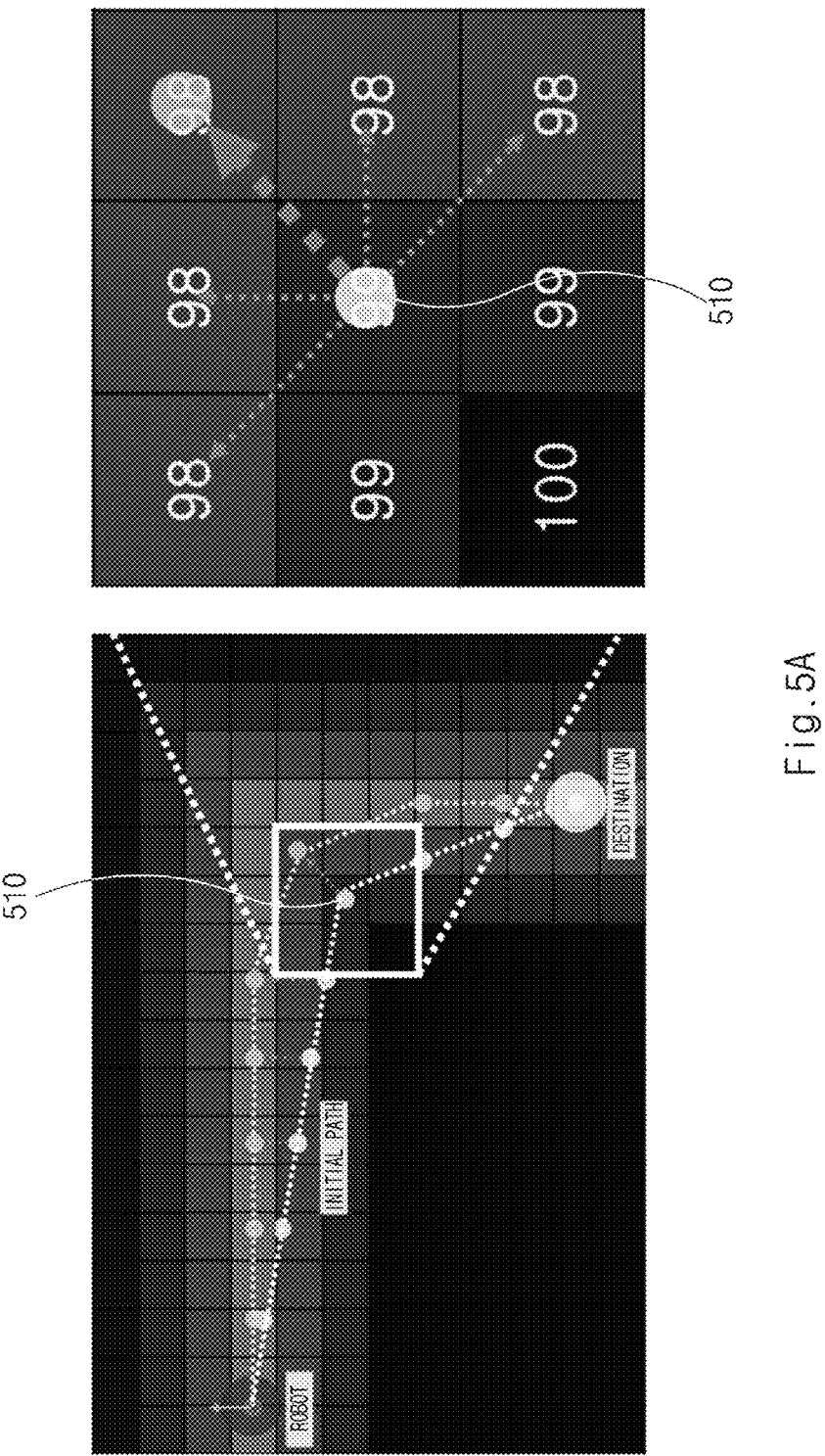
FIG. 5A is a diagram showing an example of a process of performing a primary modification for each of nodes on an initial path in the controller provided in the robot path planning apparatus.

FIG. 5A is a diagram showing an example of a process of performing a primary calibration for each of nodes on an initial path in the controller provided in the robot path planning apparatus, and a description will be given by taking a node 510 on the initial path as an example.

Referring to 5A, the controller 30 may calculate an 8-direction vector of the node 510 based on costs for grids. In this case, the controller 30 may calculate the 8-direction vector based on the following [Equation 1], for example.

$$f_r = k_r \sum_{i=-1}^{1} \sum_{j=-1}^{1} f_{ij} \qquad \text{[Equation 1]}$$

$$f_{ij} = \frac{g_{ij} - g_{00}}{\|g_{ij} - g_{00}\|}, \quad c(g_{ij}) < c(g_{00})$$

$$f_{ij} = 0, \qquad c(g_{ij}) \geq c(g_{00})$$

where $k_r$ is a normalization constant, $g_{00}$ represents a node on the initial path, $g_{ij}$ represents an adjacent area of one node, and $c(g_{ij})$ represents the cost of $g_{ij}$. Accordingly, when $c(g_{ij}) \geq c(g_{00})$, $f_{ij}$ is 0.

In FIG. 5A, when the cost of the adjacent area (adjacent grid area) with respect to the node 510 is greater than or equal to the cost of the area in which the node 510 is located, the vector from the area in which the node 510 is located to the adjacent area is 0. That is, a vector from the area in which the node 510 is located to the left area, a vector from the area in which the node 510 is located to the lower area, and a vector from the area in which the node 510 is located to the lower left area are all 0.

In some implementations, when the cost of the adjacent area (adjacent grid area) with respect to the node 510 is less than the cost of the area in which the node 510 is located, the controller 30 may calculate a vector from the area in which the node 510 is located to the adjacent area. For example, the controller 30 may individually calculate a vector from the area where the node 510 is located to the upper left area, a vector from the area where the node 510 is located to the top area, a vector from the area where the node 510 is located to the upper right area, a vector from the area where the node 510 is located to the right area, and a vector from the area where the node 510 is located to the lower right area.

The controller 30 may determine, as a location of the node 510, the sum of the vector from the area where the node 510 is located to the upper left area, the vector from the area where the node 510 is located to the top area, the vector from the area where the node 510 is located to the upper right area, the vector from the area where the node 510 is located to the right area, and the vector from the area where the node 510 is located to the lower right area. In this case, the sum of the vector from the area where the node 510 is located to the upper left area and the vector from the area where the node 510 is located to the lower right area are offset each other, and the sum of the vector from the area where the node 510 is located to the top area, the vector from the area where the node 510 is located to the upper right area, and the vector from the area where the node 510 is located to the right area is the vector from the area where the node 510 is located to the upper right area, so that the controller 30 may determine the upper right area as the location of the node 510. As a result, the controller 30 may determine the calibrated position for all nodes on the initial path in the above-described manner.

In some implementations, the controller 30 may perform secondary calibration such that the distance of the primarily-calibrated initial path is shortened and the primarily-calibrated path forms a smooth curve. This secondary calibration will be described in detail with reference to FIG. 5B.

Figure 5B:
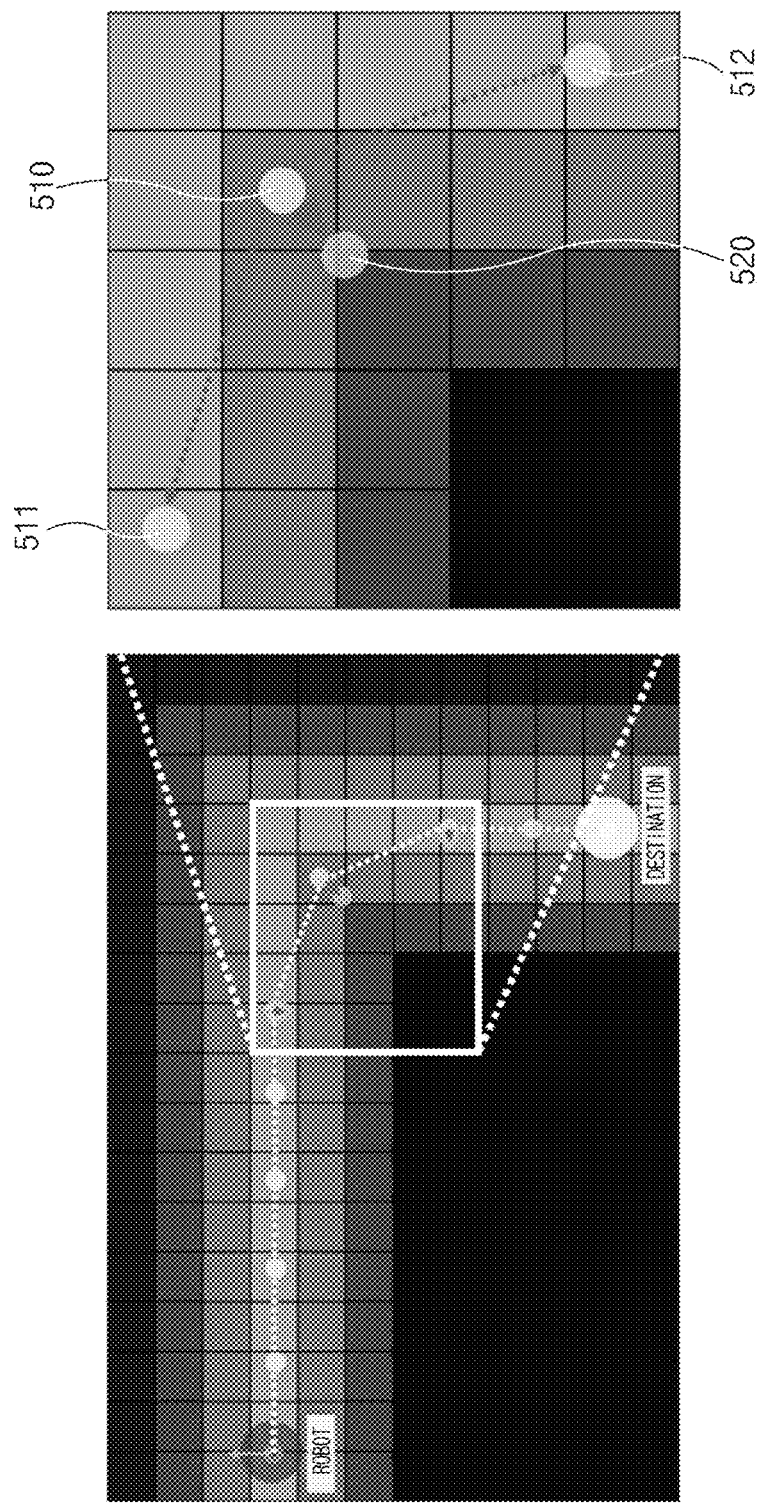
FIG. 5B is a diagram showing an example of a process of performing a secondary calibration for each of nodes on a primarily-calibrated initial path in the controller provided in the robot path planning apparatus.

FIG. 5B is a diagram showing an example of a process of performing a secondary calibration for each of nodes on a primarily-calibrated initial path in the controller provided in the robot path planning apparatus, and a description will be given by taking a node 510 on the primarily-calibrated initial path as an example.

Referring to FIG. 5B, the controller 30 may calculate vectors from the node 510 to two adjacent nodes 511 and 512 and determine, as the location of the node 510, a location 520 corresponding to the sum of the vector from the node 510 to the node 511 and the vector from the node 510 to the node 512. In this case, the controller 30 may calculate sum of the vector from the node 510 to the node 511 and the vector from the node 510 to the node 512 based on Equation 2 below.

$$f_c = k_c \left\{ \frac{k_a(p_{n-1} - p_n)}{\|p_{n-1} - p_n\|} + \frac{k_b(p_{n+1} - p_n)}{\|p_{n+1} - p_n\|} \right\} \quad \text{[Equation 2]}$$

where $p_n$ represents the node 510 as the coordinates of the n-th node, $p_{n-1}$ represents the node 511 as the coordinates of the (n−1)-th node, and $p_{n-1}$ represents the node 512 as the coordinates of the (n+1)-th node. In addition, $k_a$ represents the weight of the node 511, $k_b$ represents the weight of the node 512, and kc represents the total weight. In this case, $k_a$ and $k_b$ may be set to the same value (e.g., 1) or may be set to different values. When $k_a$ and $k_b$ are set to different values, $k_a$ and $k_b$ may be set to a value proportional to a distance from the node 510 or set to a value inversely proportional to the distance from the node 510. In addition, $k_a$ and kb may be set to a value proportional to an angle formed with the node 510 or set to a value inversely proportional to the angle formed with the node 510.

In some implementations, when the distance between two adjacent nodes on the secondarily-calibrated initial path is greater than a preset first distance, the controller 30 may add a new node at the middle of the two nodes. The addition of such a new node will be described in detail with reference to FIG. 6.

Figure 6:
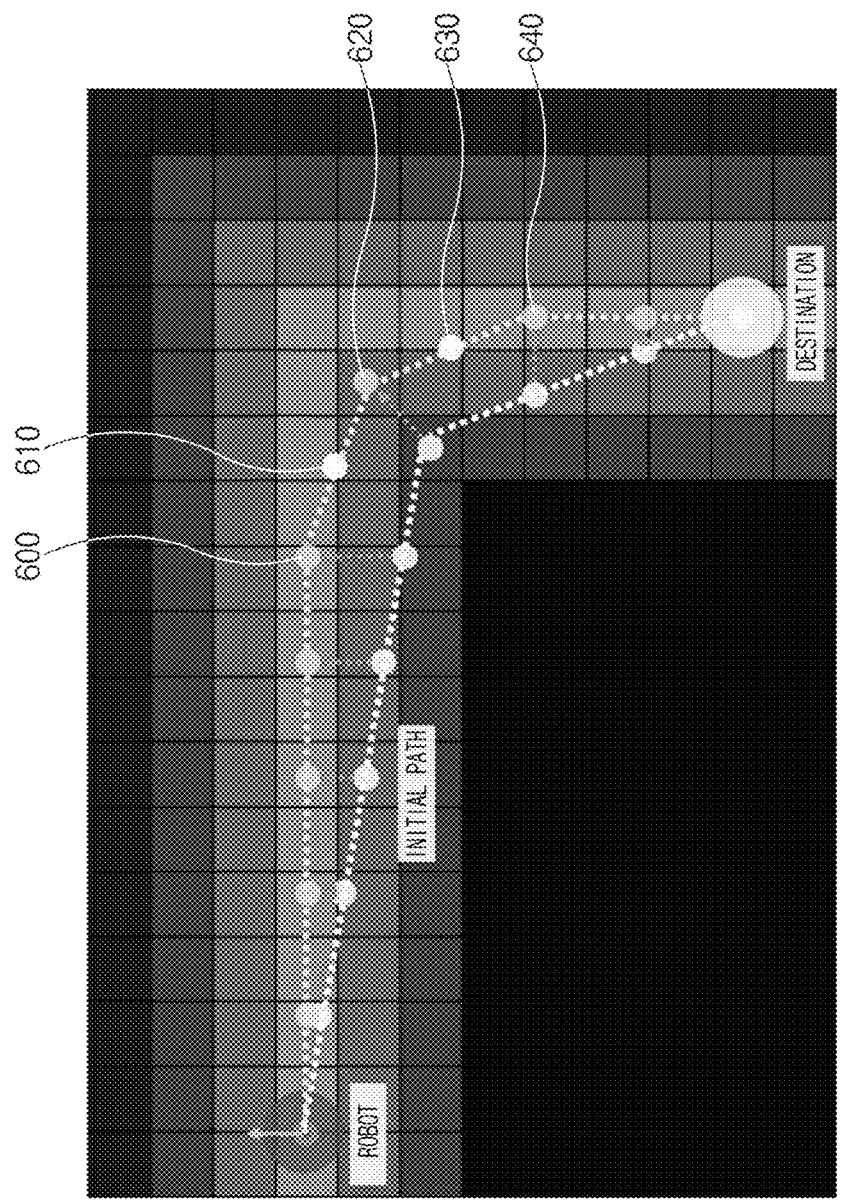
FIG. 6 is a diagram showing an example of a process of adding a new node to a secondarily-modified initial path by a controller provided in a robot path planning apparatus.

FIG. 6 is a diagram showing an example of a process of adding a new node to a secondarily-calibrated initial path by a controller provided in a robot path planning apparatus.

Referring to FIG. 6, when the distance between a node 600 and a node 620 on the secondarily-calibrated initial path is greater than a preset first distance, the controller 30 may add a new node 610. In addition, when the distance between a node 620 and a node 640 on the secondarily-calibrated initial path is greater than the preset first distance, the controller 30 may add a new node 630.

Conversely, when the distance between two adjacent nodes on the secondarily-calibrated initial path is equal to or less than a preset second distance, the controller 30 may delete any one of the two nodes.

Figure 7:
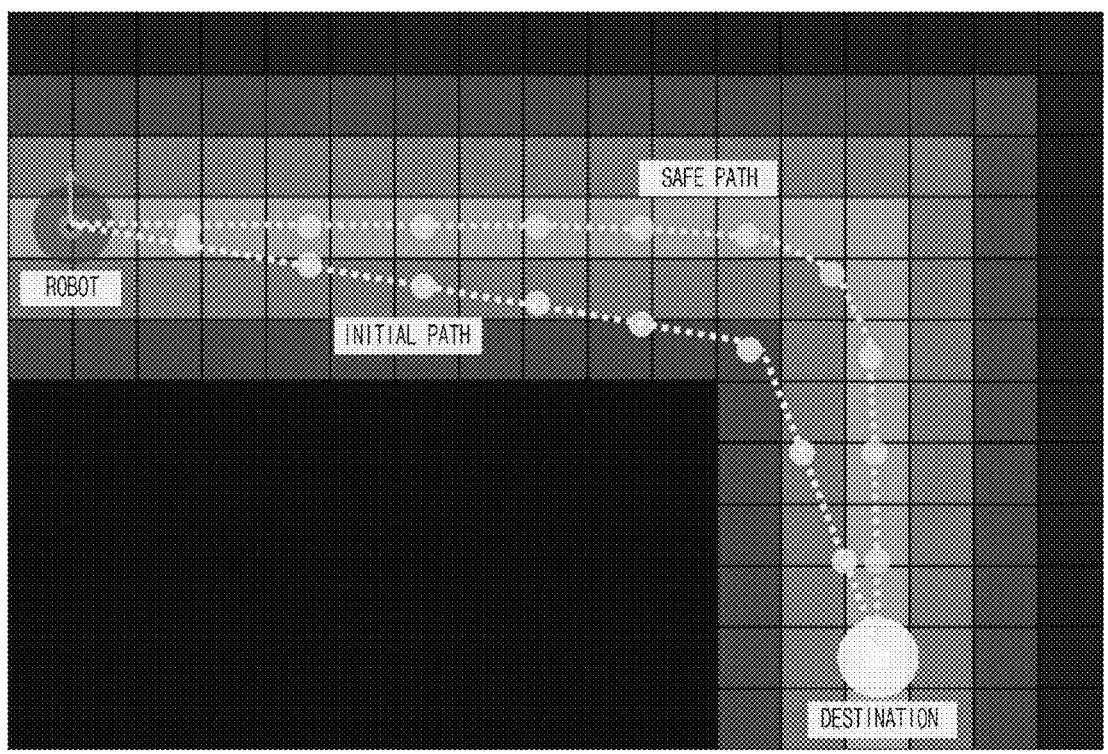
FIG. 7 is a diagram showing an example of a safe path planned by a controller provided in a robot path planning apparatus.

The safe path in which the above-described primary and secondary calibrations and addition and deletion of nodes are completed is shown in FIG. 7.

FIG. 7 is a diagram showing an example of a safe path planned by a controller provided in a robot path planning apparatus.

As shown in FIG. 7, a safe path does not include a section with sharp bends to enable a robot to move naturally, and a sufficient safe distance from obstacles is ensured to enable safe driving of the robot. In particular, the controller 30 is able to plan the safe path without performing a preprocessing process which requires a long time, thus, significantly reducing time required to plan the safe path. For reference, entire time required for the primary and secondary calibrations and for addition and deletion of nodes as described above may be significantly shorter than the time required for the preprocessing process.

In some implementations, the controller 30 may quickly change the various initial paths to safe paths regardless of how the initial path is planned. Details will be given with reference to FIGS. 8A and 8B.

Figure 8A:
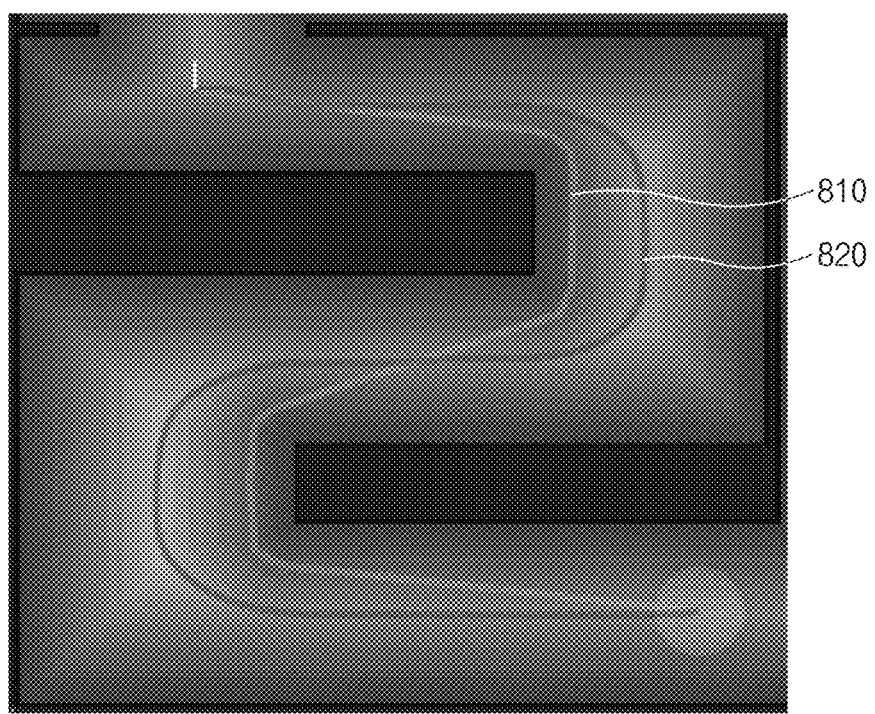
FIG. 8A is a diagram showing an example result of changing an RRT algorithm-based initial path to a safe path by a controller provided in a robot path planning apparatus.

FIG. 8A is a diagram showing an example result of changing an RRT algorithm-based initial path to a safe path by a controller provided in a robot path planning apparatus.

As shown in FIG. 8A, an initial path 810 planned based on the RRT algorithm involves a time-consuming preprocessing process, but does not form a gentle curve and have no sufficient separation distance from an obstacle, causing a risk of collision.

The controller 30 may plan a safe path 820 by performing primary calibration and secondary calibration, and addition and deletion of nodes on the initial path 810 planned based on the RRT algorithm.

Figure 8B:
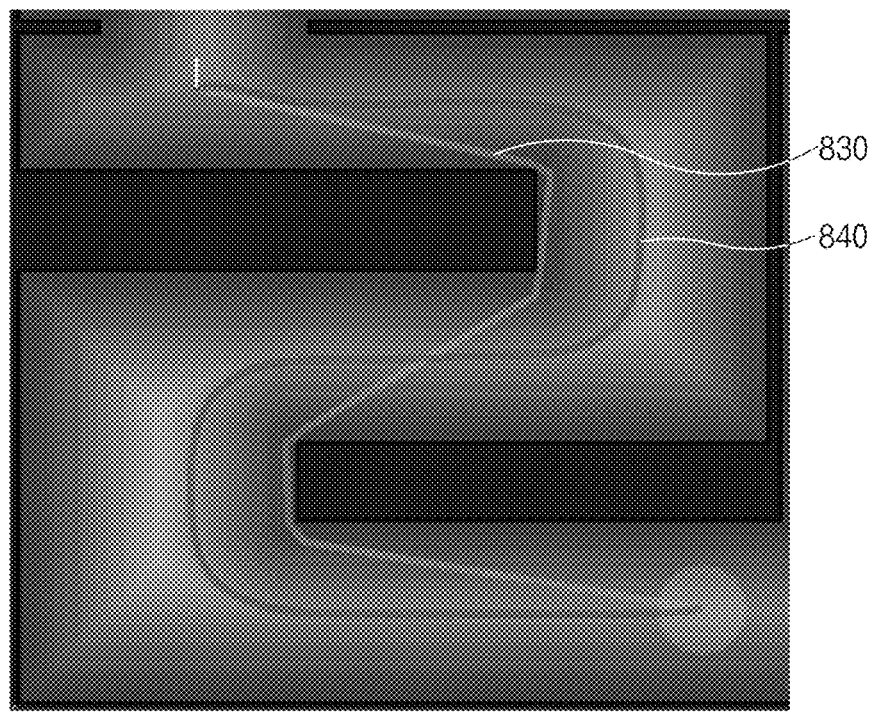
FIG. 8B is a diagram showing an example result of changing an A-star algorithm-based initial path to a safe path by a controller provided in a robot path planning apparatus.

FIG. 8B is a diagram showing an example result of changing an A-star algorithm-based initial path to a safe path by a controller provided in a robot path planning apparatus.

As shown in FIG. 8B, an initial path 830 planned based on the A-star algorithm may be a shortest path. The time for planning the initial path 830 based on the A-star algorithm may be significantly shorter than the time to plan the initial path 810 based on the RRT algorithm.

The controller 30 may plan a safe path 840 by performing primary calibration and secondary calibration, and addition and deletion of nodes on the initial path 830 planned based on the A-star algorithm.

Figure 9A:
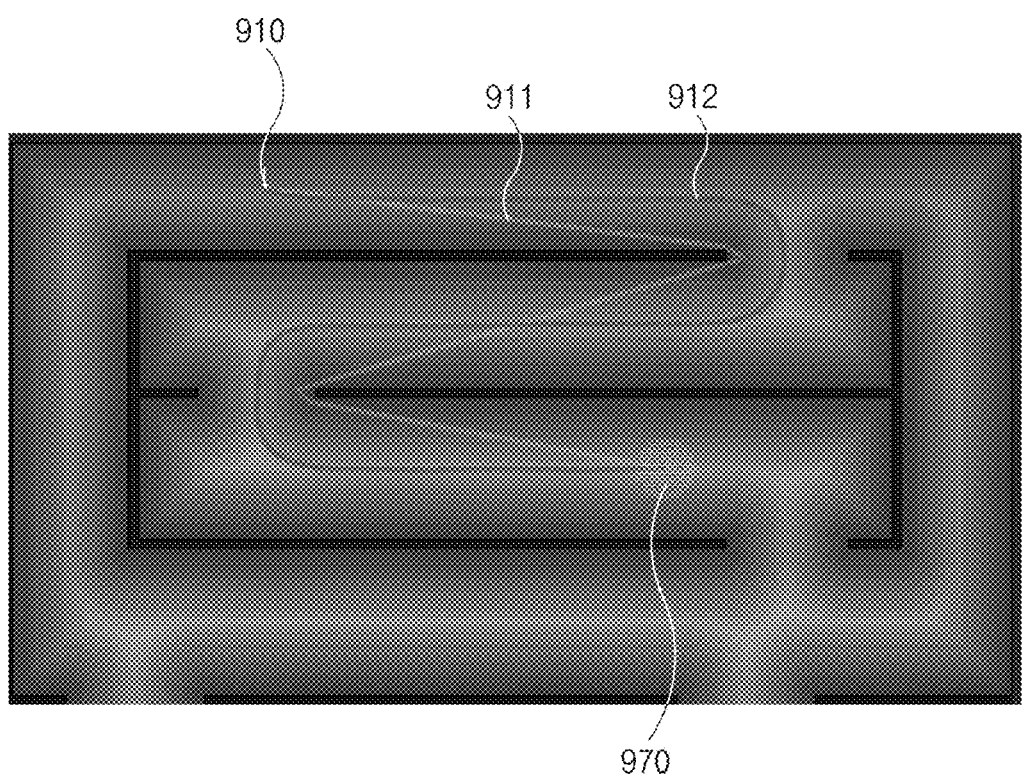
FIG. 9A is a first exemplary diagram of an initial path planned and a safe path planned based on the initial path by a controller provided in a robot path planning apparatus.

FIG. 9A is a first exemplary diagram of an initial path planned and a safe path planned based on the initial path by a controller provided in a robot path planning apparatus.

In FIG. 9A, a black area indicates a fixed obstacle, reference numeral '910' indicates a current location of the robot, and reference numeral '970' indicates a destination. The controller 30 may plan the shortest path from the current location 910 of the robot to the destination 970 as an initial path 911, and perform the primary and secondary calibrations and addition and deletion of nodes on the initial path 911 to plan a safe path 912. The safe path 912 may have a gentle curve path to enable stable movement of the robot, and no risk of collision with an obstacle because the separation distance from the obstacle is sufficient.

Figure 9B:
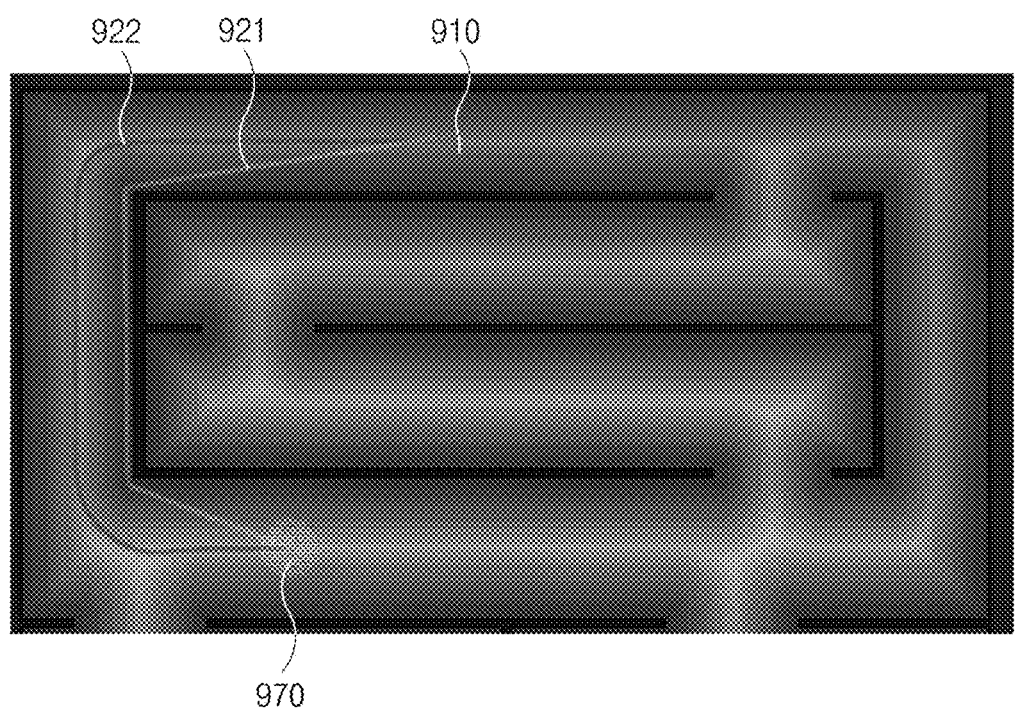
FIG. 9B is a second exemplary diagram of an initial path planned and a safe path planned based on the initial path by a controller provided in a robot path planning apparatus.

FIG. 9B is a second exemplary diagram of an initial path planned and a safe path planned based on the initial path by a controller provided in a robot path planning apparatus.

In FIG. 9B, a black area indicates a fixed obstacle, reference numeral '910' indicates a current location of the robot, and reference numeral '970' indicates a destination. The controller 30 may plan the shortest path from the current location 910 of the robot to the destination 970 as an initial path 921, and perform the primary and secondary calibrations and addition and deletion of nodes on the initial path 921 to plan a safe path 922. The safe path 922 may have a gentle curve path to enable stable movement of the robot, and no risk of collision with an obstacle because the separation distance from the obstacle is sufficient.

Figure 9C:
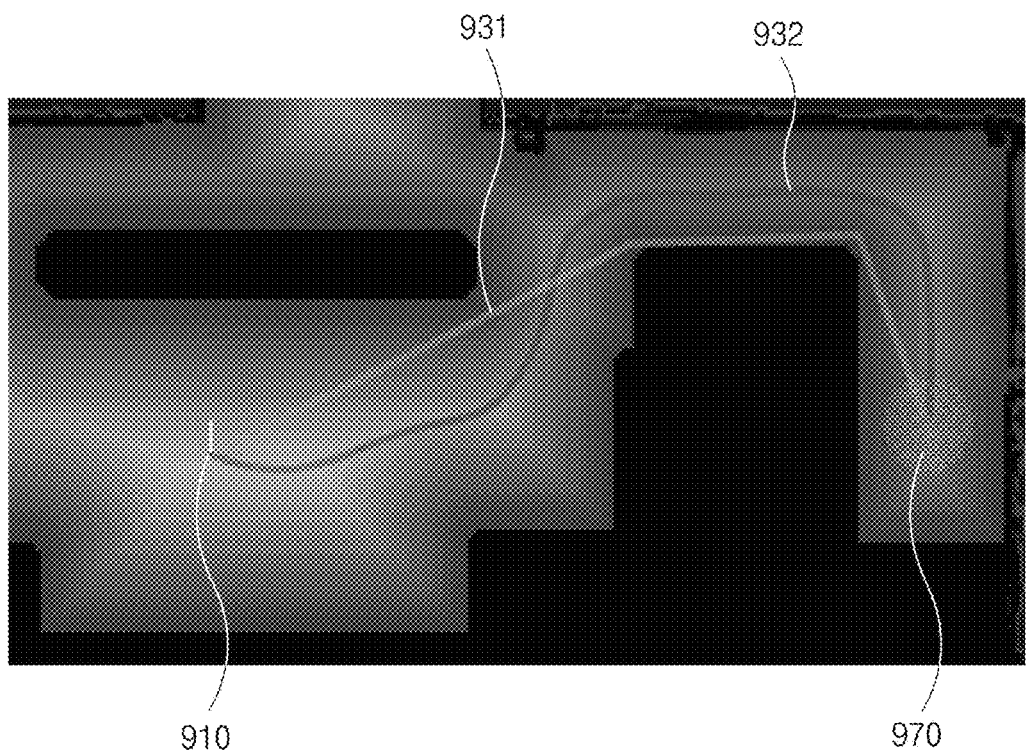
FIG. 9C is a third exemplary diagram of an initial path planned and a safe path planned based on the initial path by a controller provided in a robot path planning apparatus.

FIG. 9C is a third exemplary diagram of an initial path planned and a safe path planned based on the initial path by a controller provided in a robot path planning apparatus.

In FIG. 9C, a black area indicates a fixed obstacle, reference numeral '910' indicates a current location of the robot, and reference numeral '970' indicates a destination. The controller 30 may plan the shortest path from the current location 910 of the robot to the destination 970 as an initial path 931, and perform the primary and secondary calibrations and addition and deletion of nodes on the initial path 931 to plan a safe path 932. The safe path 932 may have a gentle curve path to enable stable movement of the robot, and no risk of collision with an obstacle because the separation distance from the obstacle is sufficient.

Figure 9D:
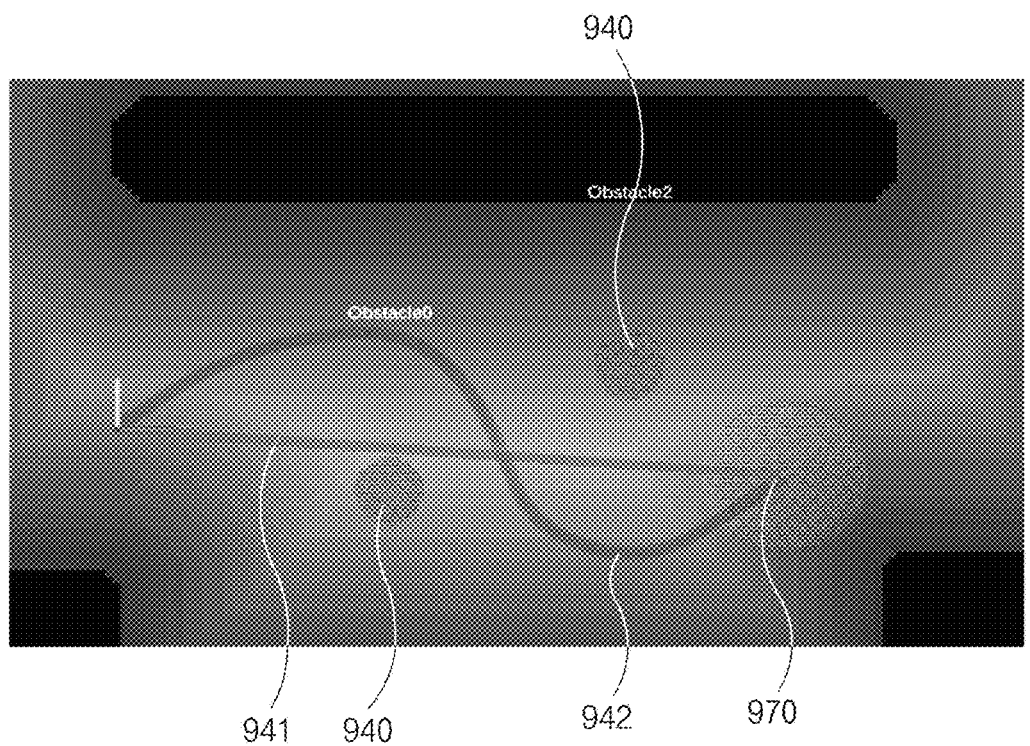
FIG. 9D is a fourth exemplary diagram of an initial path planned and a safe path planned based on the initial path by a controller provided in a robot path planning apparatus.

FIG. 9D is a fourth exemplary diagram of an initial path planned and a safe path planned based on the initial path by a controller provided in a robot path planning apparatus.

In FIG. 9D, a black area indicates a fixed obstacle, reference numeral '910' indicates a current location of the robot, reference numeral '940' indicates a moving obstacle and reference numeral '970' indicates a destination. The controller 30 may plan the shortest path from the current location 910 of the robot to the destination 970 as an initial path 941, and perform the primary and secondary calibrations and addition and deletion of nodes on the initial path 941 to plan a safe path 942. The safe path 942 may have a gentle curve path to enable stable movement of the robot, and no risk of collision with an obstacle because the separation distance from the obstacle is sufficient.

Figure 9E:
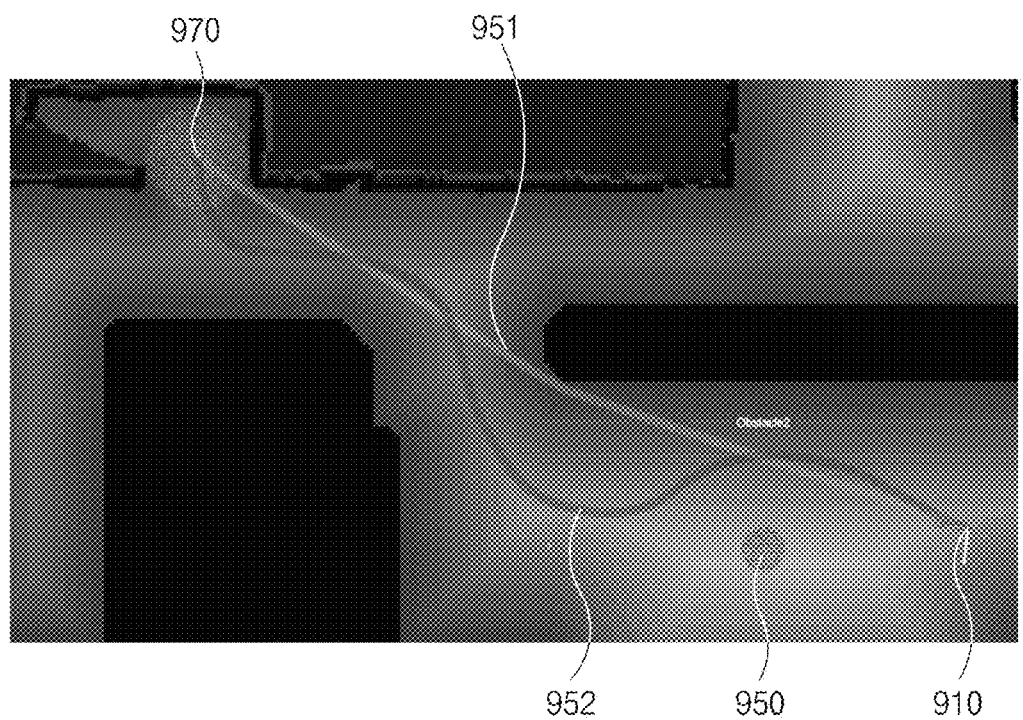
FIG. 9E is a fifth exemplary diagram of an initial path planned and a safe path planned based on the initial path by a controller provided in a robot path planning apparatus.

FIG. 9E is a fifth exemplary diagram of an initial path planned and a safe path planned based on the initial path by a controller provided in a robot path planning apparatus.

In FIG. 9E, a black area indicates a fixed obstacle, reference numeral '910' indicates a current location of the robot, reference numeral '950' indicates a moving obstacle and reference numeral '970' indicates a destination. The controller 30 may plan the shortest path from the current location 910 of the robot to the destination 970 an the initial path 951, and perform the primary and secondary calibrations and addition and deletion of nodes on the initial path 951 to plan a safe path 952. The safe path 952 may have a gentle curve path to enable stable movement of the robot, and no risk of collision with an obstacle because the separation distance from the obstacle is sufficient.

Figure 9F:
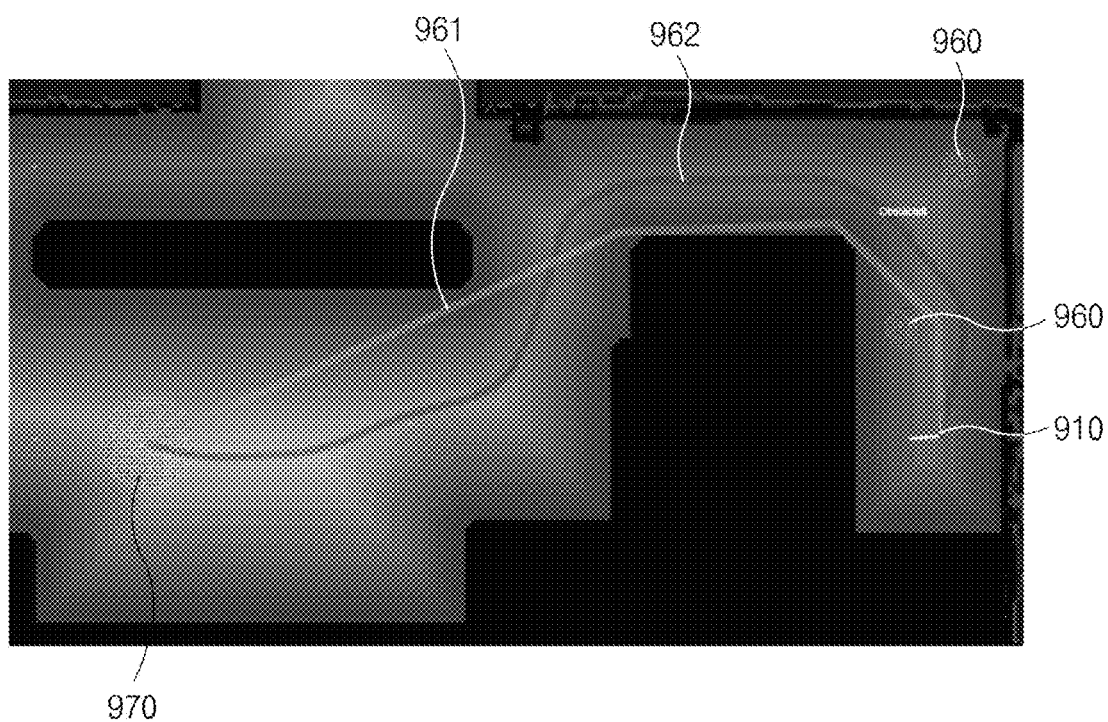
FIG. 9F is a sixth exemplary diagram of an initial path planned and a safe path planned based on the initial path by a controller provided in a robot path planning apparatus.

FIG. 9F is a sixth exemplary diagram of an initial path planned and a safe path planned based on the initial path by a controller provided in a robot path planning apparatus.

In FIG. 9F, a black area indicates a fixed obstacle, reference numeral '910' indicates a current location of the robot, reference numeral '960' indicates a moving obstacle and reference numeral '970' indicates a destination. The controller 30 may plan the shortest path from the current location 910 of the robot to the destination 970 as an initial path 961, and perform the primary and secondary calibrations and addition and deletion of nodes on the initial path 961 to plan a safe path 962. The safe path 962 may have a gentle curve path to enable stable movement of the robot, and no risk of collision with an obstacle because the separation distance from the obstacle is sufficient.

Figure 10:
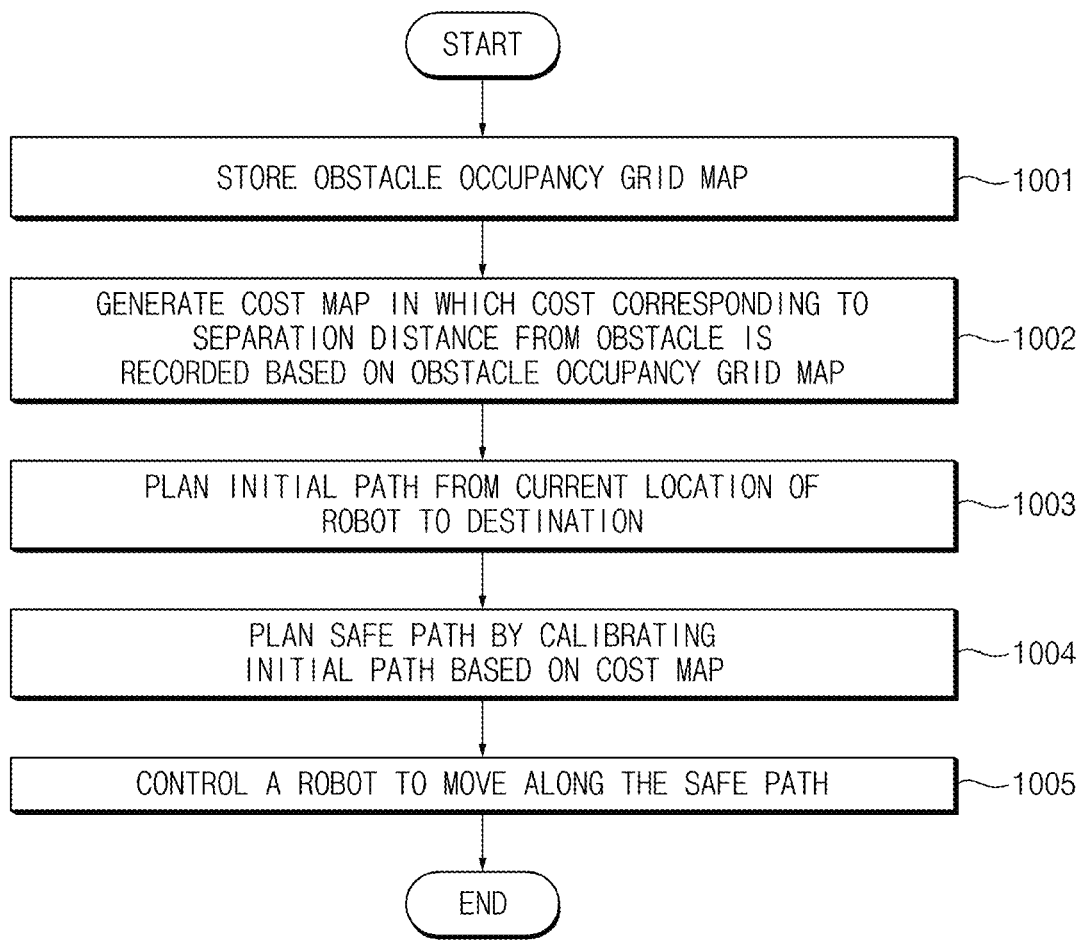
FIG. 10 is a flowchart of a method of planning a robot path.

FIG. 10 is a flowchart of a method of planning a robot path.

First, the storage 10 may store an obstacle occupancy grid map (1001).

Thereafter, the controller 30 may generate a cost map in which a cost corresponding to a separation distance from an obstacle is recorded based on an obstacle occupancy grid map (1002).

Thereafter, the controller 30 may plan an initial path from the current location of the robot to the destination (1003).

Thereafter, the controller 30 may plan a safe path by calibrating the initial path based on the cost map (1004).

Thereafter, the controller 30 may control the robot to move along the safe path (1005).

Figure 11:
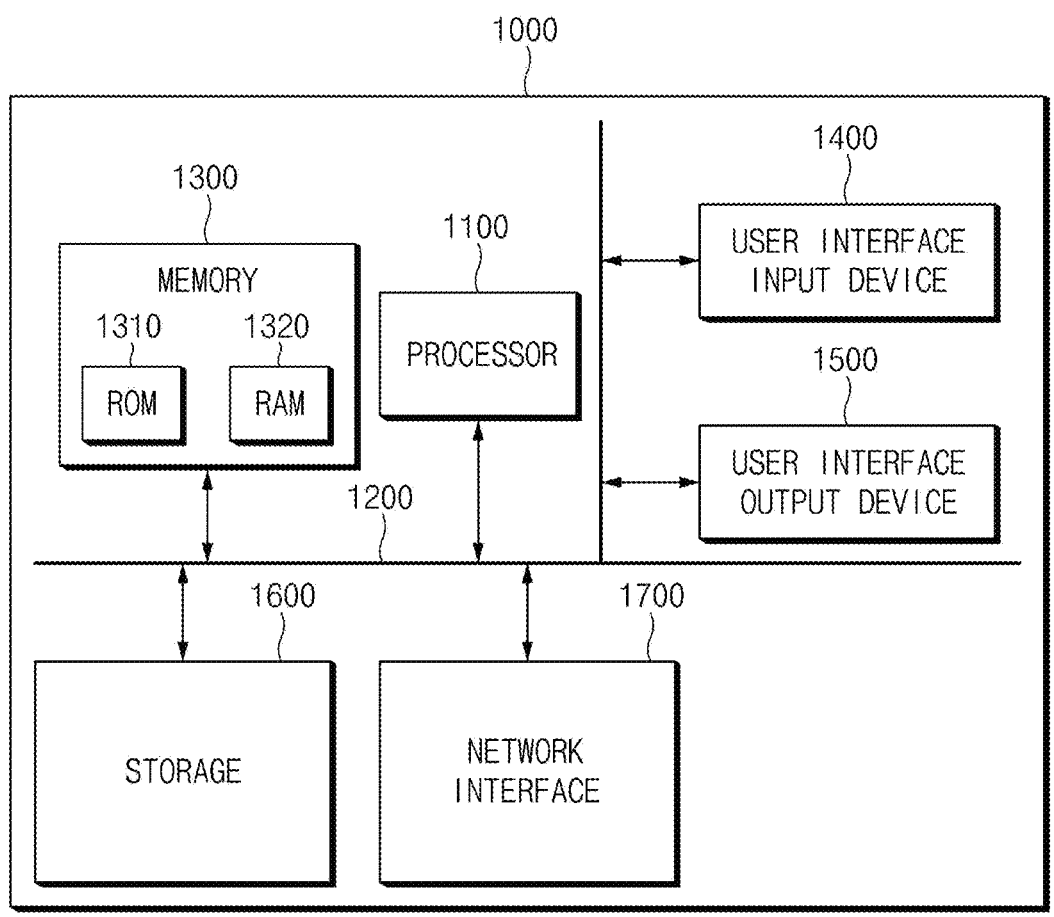
FIG. 11 is a block diagram illustrating a computing system for performing a method of planning a robot path.

FIG. 11 is a block diagram illustrating a computing system for performing a method of planning a robot path.

Referring to FIG. 11, the method of planning a robot path as described above may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the implementations disclosed herein may be implemented directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various calibrations and variations may be made without departing from the essential characteristics of the present disclosure by those skilled in the art to which the present disclosure pertains.

Therefore, the exemplary implementations of the present disclosure are provided to explain the spirit and scope of the present disclosure, but not to limit them, so that the spirit and scope of the present disclosure is not limited by the implementations. The scope of protection of the present disclosure should be interpreted by the following claims, and all technical ideas within the scope equivalent thereto should be construed as being included in the scope of the present disclosure.

The robot path planning apparats and the method thereof according to the present disclosure generate a cost map in which a cost corresponding to a separation distance from an obstacle is recorded based on an obstacle occupancy grid map, plan the initial path from a current location of a robot to a destination on the cost map, and plan a safe path by calibrating the initial path based on each cost on the cost map, making it possible to secure a sufficient safe distance from the obstacle without a pre-processing process of expanding the area of the obstacle, thereby enabling safe driving of the robot, as well as quickly securing the safe path because there is no need to perform the pre-processing process with time consumed.

What is claimed is:

1. A robot path planning apparatus comprising:
   a storage configured to receive an obstacle occupancy grid map; and
   a controller configured to:
      generate a cost map in which a cost corresponding to a separation distance from an obstacle to a movement area to which a robot is able to move is assigned, based on the obstacle occupancy grid map,
      determine a first path from a current location of the robot to a destination,
      determine a second path by calibrating the first path based on the cost map, and
      control the robot to move along the second path,
   wherein determining the second path comprises:
      determining one or more areas each having a cost less than a cost of a first area in which a first node on the first path is located, the one or more areas being adjacent to the first area;
      calculating one or more vectors from the first area to the determined one or more areas,
      determining, as a first location, an area in which a sum of the calculated one or more vectors is located and adjacent to the first node, and
      calibrating the first path by moving the first node on the first path to the first location to thereby cause the second path to include the first location, and
   wherein the controller is configured to:
      calculate a plurality of vectors from the first node on the calibrated first path to two adjacent nodes, respectively,
      determine a location corresponding to a sum of the plurality of vectors as a second location of the first node on the calibrated first path, and
      calibrate the calibrated first path by moving the first node on the calibrated first path to the second location to thereby cause the second path to replace the first location with the second location.

2. The robot path planning apparatus of claim 1, further comprising:
   a sensor device configured to detect the obstacle around the robot,
   wherein the controller is configured to add an area corresponding to the detected obstacle to the obstacle occupancy grid map.

3. The robot path planning apparatus of claim 1, wherein the controller is configured to increase the cost of the cost map as the separation distance from the obstacle to the movement area decreases.

4. The robot path planning apparatus of claim 1, wherein the controller is configured to determine a shortest path from the current location of the robot to the destination as the first path.

5. The robot path planning apparatus of claim 1, wherein the controller is configured to, based on a distance between the two adjacent nodes being greater than a preset first distance, add a new node at a middle of the two adjacent nodes on the first path calibrated by moving the first node to the second location.

6. The robot path planning apparatus of claim 1, wherein the controller is configured to, based on a distance between the two adjacent nodes being less than or equal to a preset second distance, delete one of the two adjacent nodes on the first path calibrated by moving the first node to the second location.

7. A method of planning a robot path comprising:
   storing, by a storage, an obstacle occupancy grid map;
   generating, by a controller, a cost map in which a cost corresponding to a separation distance from an obstacle to a movement area to which a robot is able to move is assigned, based on the obstacle occupancy grid map;
   determining, by the controller, a first path from a current location of the robot to a destination;
   determining, by the controller, a second path by calibrating the first path based on the cost map; and
   controlling the robot to move along the second path,
   wherein determining the second path comprises:
      determining one or more areas each having a cost less than a cost of a first area in which a first node on the first path is located, the one or more areas being adjacent to the first area;
      calculating one or more vectors from the first area to the determined one or more areas,
      determining, as a first location, an area in which a sum of the calculated one or more vectors is located and adjacent to the first node, and calibrating the first path by moving the first node on the first path to the first location to thereby cause the second path to include the first location, and wherein calibrating the first path comprises:

calculating a plurality of vectors from the first node on the calibrated first path to two adjacent nodes, respectively, determining a location corresponding to a sum of the plurality of vectors as a second location of the first node on the calibrated first path, and calibrating the calibrated first path by moving the first node on the calibrated first path to the second location to thereby cause the second path to replace the first location with the second location.

8. The method of claim 7, further comprising:

detecting, by a sensor device, the obstacle around the robot; and adding an area corresponding to the detected obstacle to the obstacle occupancy grid map.

9. The method of claim 7, wherein the cost of the cost map increases as the separation distance from the obstacle to the movement area decreases.

10. The method of claim 7, wherein determining the first path includes determining a shortest path from the current location of the robot to the destination as the first path.

11. The method of claim 7, further comprising:

adding, based on a distance between the two adjacent nodes being greater than a preset first distance, a new node at a middle of the two adjacent nodes on the first path calibrated by moving the first node to the second location.

12. The method of claim 7, further comprising:

deleting, based on a distance between the two adjacent nodes being less than or equal to a preset second distance, one of the two adjacent nodes on the first path calibrated by moving the first node to the second location.

* * * * *